US012194482B2

(12) United States Patent
Huang

(10) Patent No.: US 12,194,482 B2
(45) Date of Patent: Jan. 14, 2025

(54) PUMP HEAD AND CONTAINER WITH PUMP HEAD

(71) Applicant: ANHUI JND PLASTIC PACKAGING Co., LTD., Huainan (CN)

(72) Inventor: Yixin Huang, Huainan (CN)

(73) Assignee: ANHUI JND PLASTIC PACKAGING Co., LTD., Huainan (CN)

(*) Notice: Subject to any disclaimer, the term of this patent is extended or adjusted under 35 U.S.C. 154(b) by 389 days.

(21) Appl. No.: 17/833,576

(22) Filed: Jun. 6, 2022

(65) Prior Publication Data

US 2022/0371036 A1 Nov. 24, 2022

Related U.S. Application Data

(63) Continuation of application No. PCT/CN2021/132985, filed on Nov. 25, 2021.

(30) Foreign Application Priority Data

May 22, 2021 (CN) ......................... 202110561223.5

(51) Int. Cl.
*B05B 11/10* (2023.01)
*B05B 11/00* (2023.01)

(52) U.S. Cl.
CPC ...... *B05B 11/1025* (2023.01); *B05B 11/0008* (2013.01); *B05B 11/1052* (2023.01); *B05B 11/1095* (2023.01)

(58) Field of Classification Search
CPC ............. B05B 11/1052; B05B 11/1095; B05B 11/0008
See application file for complete search history.

(56) References Cited

U.S. PATENT DOCUMENTS 3,870,200 A * 3/1975 Spatz ................. B65D 83/0033 222/206
4,874,115 A * 10/1989 Weihrauch ......... B65D 83/0005 222/386

(Continued)

FOREIGN PATENT DOCUMENTS

CA 2088645 A1 8/1993
CN 1721292 A 1/2006

(Continued)

OTHER PUBLICATIONS

Translation of CN-210290034-U.*
International Search Report cited in PCT/CN2021/132985 mailed Feb. 22, 2022, 5 pages.

*Primary Examiner* — Jeremy Carroll
(74) *Attorney, Agent, or Firm* — Cooper Legal Group, LLC

(57) ABSTRACT

The present disclosure relates to a technical filed of daily chemical products, and discloses a pump head and a container with the pump head. The pump head includes a shell body, and an suction chamber is provided in the shell body; a piston body is slidably provided in the suction chamber; a pump nozzle connected with the piston body is slidably provided at the shell body; an one-way valve is provided at the piston body; a squeezing opening communicated with the pump nozzle is provided on the piston body; the one-way valve is configured to close the squeezing opening; and the squeezing surface is inclined from a position away from the squeezing opening towards the position close to the squeezing opening.

14 Claims, 11 Drawing Sheets

(56) References Cited

U.S. PATENT DOCUMENTS

| | | | | |
|---|---|---|---|---|
| 2008/0083789 | A1* | 4/2008 | Brugner | B65D 83/0005 222/386 |
| 2008/0197149 | A1* | 8/2008 | Law | B05B 11/1001 222/384 |
| 2010/0089945 | A1* | 4/2010 | Law | B05B 11/1067 141/2 |
| 2010/0147896 | A1* | 6/2010 | Obrist | B05C 17/00576 222/386 |
| 2012/0061424 | A1* | 3/2012 | Obrist | B65D 83/0033 222/137 |

FOREIGN PATENT DOCUMENTS

| | | | | |
|---|---|---|---|---|
| CN | 1743081 | A | | 3/2006 |
| CN | 1915758 | A | | 2/2007 |
| CN | 102126575 | A | | 7/2011 |
| CN | 110254945 | A | | 9/2019 |
| CN | 210290034 | U | * | 4/2020 |
| CN | 112320058 | A | | 2/2021 |
| CN | 113002972 | A | | 6/2021 |
| CN | 113202711 | A | | 8/2021 |
| CN | 113250923 | A | | 8/2021 |
| JP | H1030552 | A | | 2/1998 |
| JP | 2004243274 | A | | 9/2004 |

* cited by examiner

PUMP HEAD AND CONTAINER WITH PUMP HEAD

CROSS-REFERENCE TO RELATED APPLICATION

The present application is a continuation of international application No. PCT/CN2021/132985, filed on Nov. 25, 2021, which claims the priority to Chinese patent application No. 202110561223.5, filed on May 22, 2021. The entireties of international application No. PCT/CN2021/132985 and Chinese patent application No. 202110561223.5 are hereby incorporated by reference herein and made a part of this specification.

TECHNICAL FIELD

The present application relates to the technical filed of daily chemical products, in particular to a pump head and a container with the pump head.

BACKGROUND ART

At present, a common pump-type toothpaste packaging requires a user to press a toothpaste pump head to squeeze out internal toothpaste. Compared with a traditional toothpaste tube, it is beneficial to squeeze out the toothpaste fully and simplify operation of taking out the toothpaste at the same time.

However, in the above related technology, when taking out the toothpaste from the pump-type toothpaste packaging on the market, the toothpaste can only be squeezed out by a relatively slow speed.

SUMMARY

In order to solve the problem that the speed of squeezing out toothpaste is slow from the pump-type toothpaste packaging, the present application provides a pump head and a container with the pump head.

First, the present application provides a pump head, which adopts the following technical solutions.

A pump head includes a shell body. A suction chamber is provided in the shell body and unidirectionally communicated with outside; a piston body is slidably mounted in the suction chamber; a pump nozzle is slidably mounted on the shell body and connected with the piston body; a one-way valve is provided on the piston body; the piston body and the pump nozzle are configured to move together to squeeze a material in the suction chamber so that the material is pumped out via the one-way valve and the pump nozzle; a squeezing opening communicated with the pump nozzle is provided on the piston body; the one-way valve is configured to close the squeezing opening; and a side surface of the piston body configuring for squeezing the material in the suction chamber is configured as a squeezing surface, and the squeezing surface is inclined from a position away from the squeezing opening toward a position close to the squeezing opening.

In the above technical solution, for pumping the material, a user presses the pump nozzle, which is moved to drive the piston body to slide in the suction chamber to squeeze the materials in the filler chamber. The materials is pumped out through the squeezing opening and the pump nozzle after being squeezed. After pumping, the pump nozzle is moved reversely to drive the piston body to move reversely, and the material is supplemented into the suction chamber from outside. By the providing of the one-way valve in the squeezing opening, the material squeezed and pumped out of the squeezing opening will not return to the suction chamber due to the blocking of the one-way valve. In a next pumping operation, the user can quickly extract the material remaining outside the squeezing opening by pressing the pump nozzle. In addition, because the squeezing surface of the piston body is inclined from the position away from the squeezing opening toward the position close to the squeezing opening, the material in the squeezing opening in the suction chamber can be squeezed and guided to the squeezing opening, and pumped out through the squeezing opening and the pump nozzle. It solves the problem that the speed of the material being squeezed and pumped out is slow.

In some embodiments, a filler chamber is formed by the squeezing surface and an inner wall of the suction chamber, and a sunk portion extending toward the filler chamber is formed on the piston body.

In the above technical solution, the providing of the sunk portion reduces the volume of the suction chamber to a certain extent, and reduces a distance between the squeezing surface of the piston body and the bottom wall of the squeezing chamber. The providing of the inclined squeezing surface not only improves the transverse squeezing speed of the material in the filler chamber, but also improves the longitudinal squeezing speed of the material in the filler chamber.

In some embodiments, the squeezing surface is inclined in a direction from the sunk portion to the squeezing opening.

In the above technical solution, when pumping, the sunk portion rapidly squeezes the material, while the inclined surface of the squeezing surface rapidly guides the material to the squeezing opening, that is, the speed of squeezing and pumping out the material is increased by a combination of the longitudinal rapid squeezing and the transverse rapid guiding.

In some embodiments, a side surface of the piston body away from the squeezing surface is configured as a negative pressure surface, a negative pressure chamber is formed by the negative pressure surface and an inner wall of the suction chamber, and the squeezing surface is inclined in a direction from a position away from the squeezing opening towards the negative pressure chamber.

In the above technical solution, the inclining direction of the squeezing surface is limited to further increase the speed of squeezing out the materials.

In some embodiments, a limiting portion extending toward the negative pressure chamber is formed on the piston body, and abuts against an inner wall of the negative pressure chamber.

In the above technical solution, the limiting portion can not only limit the sliding position of the piston body in the suction chamber, but also can limit the actual volume of the filler chamber.

In some embodiments, a recess is formed at a position of the sunk portion away from the filler chamber, and a stiffener is formed in the recess.

In the above technical solution, the recess corresponds to the sunk portion, and the stiffener in the recess can improve the structural strength of the sunk portion. In the process of squeezing and pumping the material by the piston body, the anti-squeezing performance of the piston body, especially the sunk portion, can be improved.

In some embodiments, a restoring part configured to restore both the pump nozzle and the piston body after pressing is provided in the shell body. In some embodiments, the restoring part is a spring or an elastomer.

In the above technical solution, the providing of the restoring part can realize the automatic restoring after the pump nozzle is pressed, that is, realize the reciprocating motion of the piston body, which can simplify the pumping operation, and provide good practicability.

In some embodiments, the suction chamber includes a bottom plate communicated with outside, a feed port is provided on the bottom plate, and the feed port includes a central opening corresponding to the squeezing opening and a peripheral opening surrounding the central opening.

In the above technical solution, the material can be rapidly replenished from outside to the central position of the suction chamber through the central opening. In addition, the material also can be rapidly replenished from outside to the peripheral position of the suction chamber through the peripheral opening. To a certain extend, the material replenished to the peripheral position pushes the material initially in the suction chamber to flow toward the central position, so as to achieve a purpose of rapidly filling the suction chamber.

In some embodiments, the one-way valve includes a mounting part fixed on the piston body; an arm portion is extended from the mounting part toward the squeezing opening, connected with a shielding part, the shielding part is made of an elastic material and configured to close the squeezing opening; the piston body and the pump nozzle are configured to move together to squeeze the material in the suction chamber so that the shielding part is elastically deformed due to squeezing by the material to open the squeezing opening.

In the above technical solution, when pumping the material, the material in the suction chamber squeezes the shielding part, and the shielding part is elastically deformed thereby to open the squeezing opening. After the pumping, the shielding part may be rapidly restored to close the squeezing opening, so as to achieve the purpose of unidirectional flow.

In some embodiments, the arm portion is made of an elastic material; the arm portion includes a rear arm integrated with the mounting part and a front arm integrated with the shielding part; and the rear arm and the front arm are integrated with each other in misaligned manner.

In the above technical solution, the arm portion includes the front arm and the rear arm, which are arranged in misaligned manner. When pumping the material, the arm portion and the shielding part can be subjected to a certain degree of elastic deformation, which is helpful to improve the smoothness of the material passing through the one-way valve, without affecting the sealing effect of the one-way valve closing the squeezing opening.

In a second aspect, the present application provides a container with the pump head, which adopts the following technical solutions.

A container having the above pump head includes a container body, the container body includes a connector detachably and sealingly connected with the shell body; the connector is provided with a discharge port for discharging material out of the container body, and the feed port of the suction chamber is communicated with the discharge port.

In the above technical solution, the connector of the container body is detachably connected with the pump head, which can realize the adaptive use of the pump head and different types of containers, and has good practicability. At the same time, it can also realize the replacement of the container body, saving resources and protecting the environment.

In some embodiments, the bottom plate of the pump head is provided with a central hole, and a distributing plate is provided in the central hole via a hanging arm elastically formed between the distributing plate and a hole wall of the central hole; the central opening is provided in the distributing plate; the peripheral opening is defined between the hole wall of the central hole and a side wall of the distributing plate; and the distributing plate abuts the connector and closes the discharge port.

In the above technical solution, when replenishing the material into the suction chamber, the piston body is moved to form the negative pressure. The material in the external structure can push open the distributing plate and enters the suction chamber through the central opening and the peripheral opening. After completing the material replenishment operation, the distributing plate is restored and fits with the connector to form a closed structure, so as to realize the purpose of unidirectional replenishment of the materials.

In some embodiments, the connector is inserted between the shell body and the suction chamber; a sealing wedge is extended from the connector toward an outer wall of the suction chamber, and is in abutment sealing fit with the outer wall of the suction chamber.

In the above technical solution, the abutment sealing fit formed between the sealing wedge and the outer wall of the suction chamber can improve the stability of the assembly of the suction chamber and the connector, and also can improve the sealing effect after assembly.

In some embodiments, a bottom plug is slidably provided in the container body along a direction of pumping out the material, and is in sliding and sealing fit with an inner wall of the container body.

In the above technical solution, in the process of replenishing the material in the container body to the suction chamber, the bottom plug pushes the material in the container body to the suction chamber under external atmospheric pressure, so as to realize a rapid replenishment of the materials.

In some embodiments, the bottom plug includes a scraping part in sliding and sealing fit with the inner wall of the container body, and the scraping part is inclined towards the inner wall of the container body and abuts against the inner wall of the container body.

In the above technical solution, in the process of the sliding of the bottom plug, the scraping part can scrape away the residual material attached to the inner wall of the container body, so as to improve the utilization rate of the material.

DETAILED DESCRIPTION

The present application is described in further detail below in combination with FIGS. 1-11.

An embodiment in the present application discloses a pump head.

Figure 1:
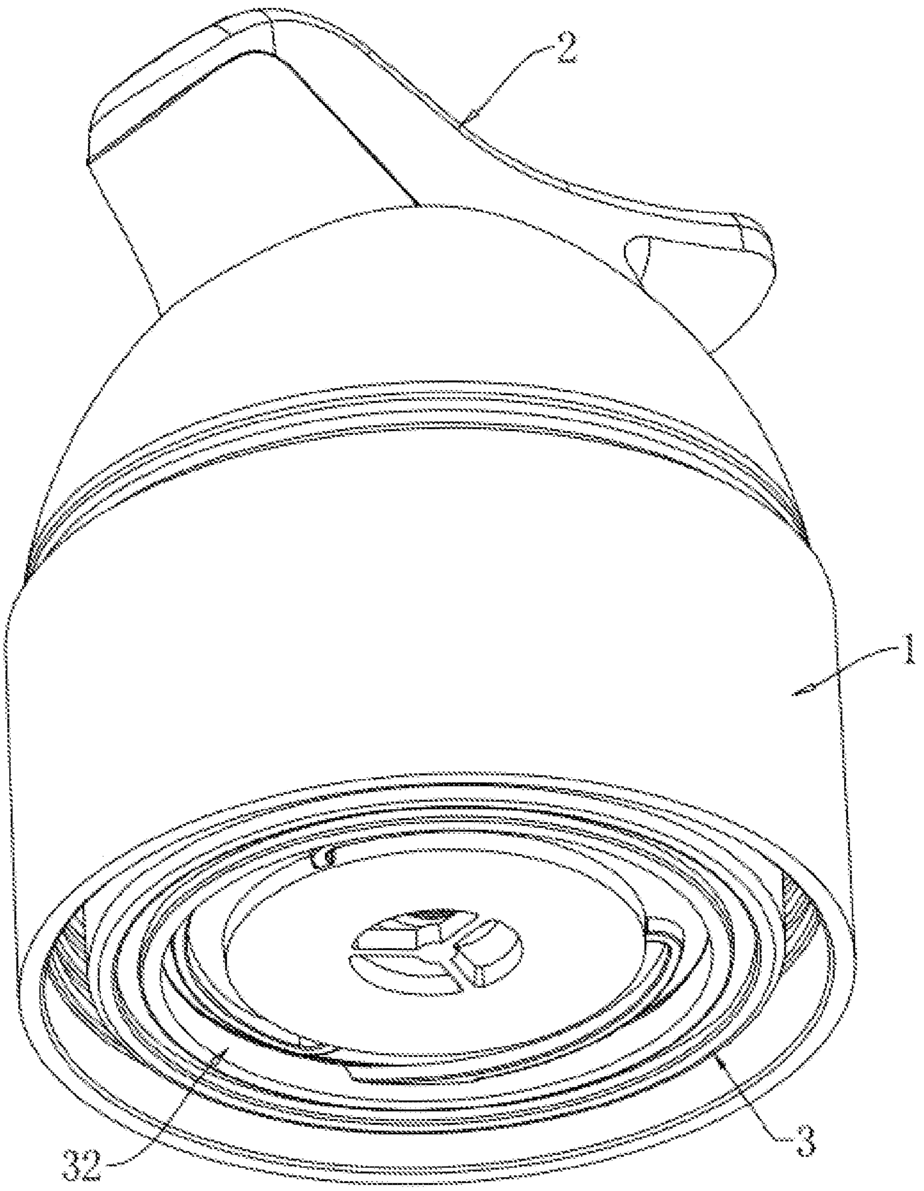
FIG. 1 is an isometric view of a pump head in accordance with one embodiment.
Figure 2:
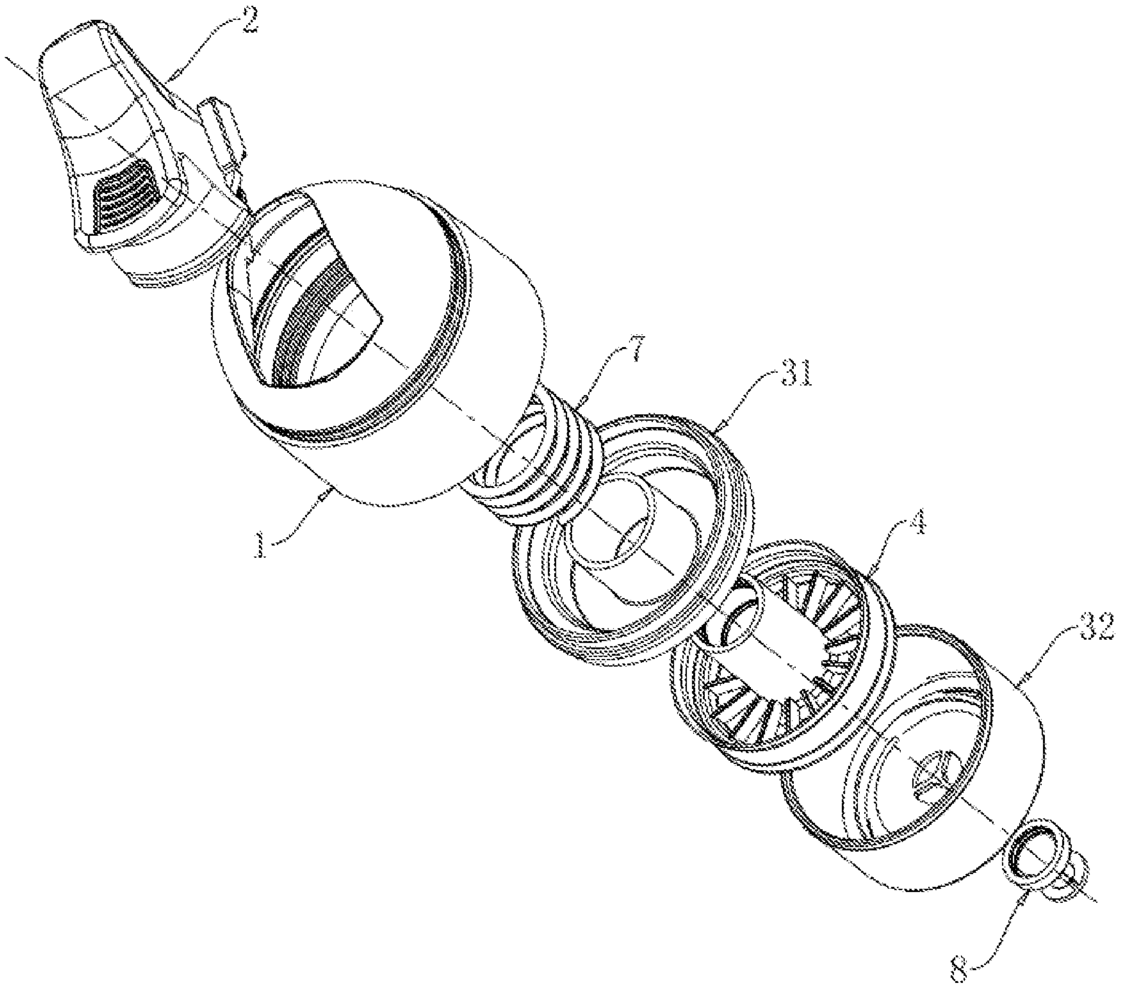
FIG. 2 is an explosion view of the pump head shown in FIG. 1.
Figure 3:
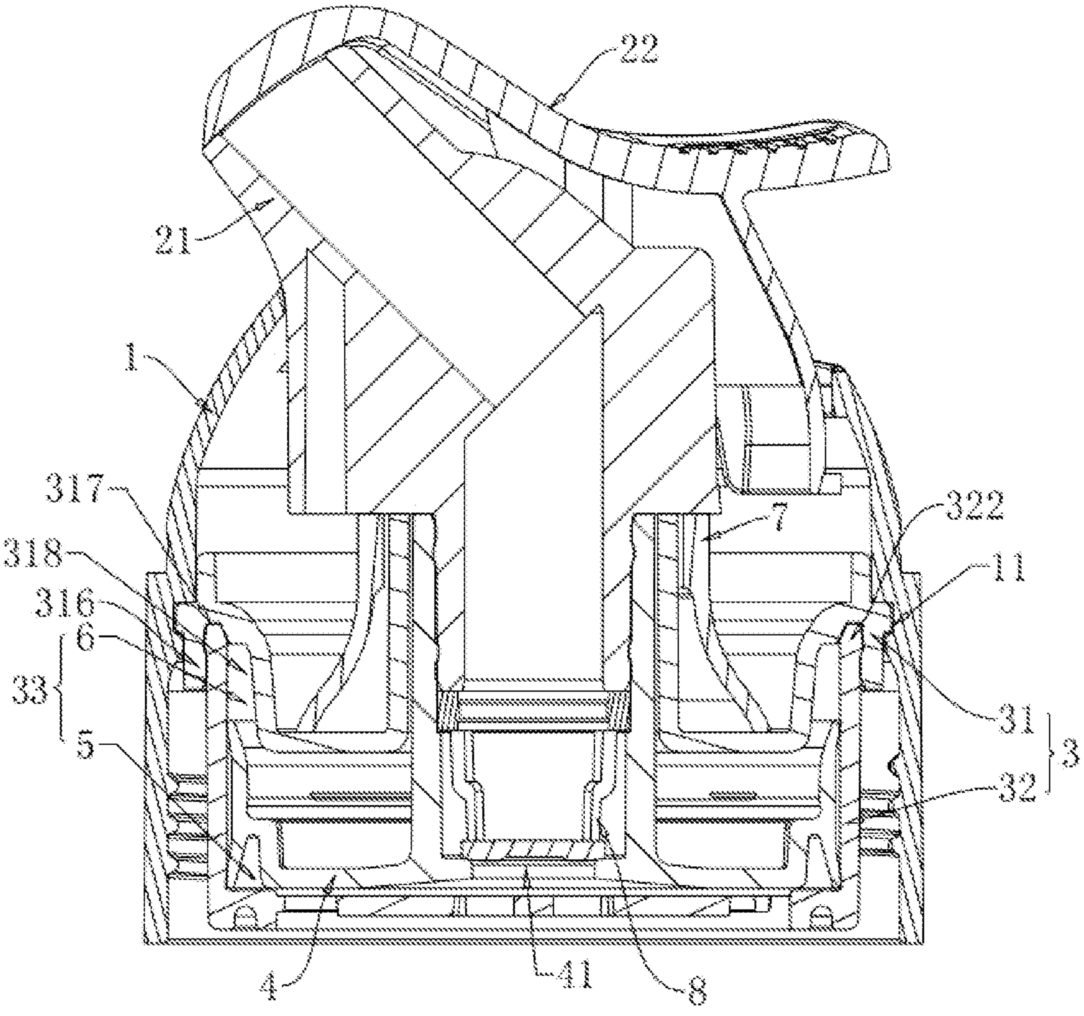
FIG. 3 is a cross-sectional view of a pump head when the restoring part is an elastomer.

As shown in FIG. 1 and FIG. 3, the pump head includes a shell body 1, and top of the shell body 1 is provided with a pump nozzle 2, and inside of the shell body 1 is provided with a suction chamber 3. A piston body 4 linking with the pump nozzle 2 is slidably installed in the suction chamber 3, and a squeezing opening 41 communicating with the pump nozzle 2 is provided in the piston body 4. Referring to FIG. 2, when the shell body 1 is connected with an external structure, the suction chamber 3 is communicated with the external structure, and the pump nozzle 2 is pressed by a user to drive the piston body 4 to move and squeeze materials in the suction chamber 3. The material is pumped out from the squeezing opening 41 in the piston body 4 and the pump nozzle 2 after squeezed, and a purpose of pumping out the materials is realized; when the pump nozzle 2 moves reversely, the pump nozzle 2 drives the piston body 4 in the suction chamber 3 to move reversely to form a negative pressure, and pump the materials in an external structure into the suction chamber 3, and replenish the materials in the suction chamber 3, and prepare for a next use of the materials.

As shown in FIG. 2 and FIG. 3, the suction chamber 3 includes an upper cover 31 clamped and fixed with an inner wall of the shell body 1, and a lower box 32 clamped and fixed with a bottom surface of the upper cover 31. An inner cavity 33 for sliding movement of the piston body 4 is formed in the suction chamber 3. The inner cavity 33 is a vertical cylindrical cavity, and a height direction of the cylindrical cavity is the same as a height direction of the shell body 1. The piston body 4 slides vertically along its height direction in the inner cavity 33. A side wall of the piston body 4 is slidably contacted with the inner wall of the inner cavity 33, when the piston body 4 slides vertically, the inner cavity 33 is divided into a filler chamber 5 locating at a lower side of the piston body 4 and a negative pressure chamber 6 locating at an upper side of the piston body 4. In combination with FIG. 4, a side surface of the piston body 4 which is used for squeezing the materials in the suction chamber 3 is named as a squeezing surface 42, that is, the filler chamber 5 is composed of the squeezing surface 42 of the piston body 4 and the inner wall of the inner cavity 33. The side surface of the piston body 4 away from the squeezing surface 42 is named as a negative pressure surface 44, that is, the negative pressure chamber 6 is composed of the negative pressure surface 44 and the inner wall of the inner cavity 33. The lower box 32 is provided with a feed port 321, and the feed port 321 communicates with the filler chamber 5. When the piston body 4 slides vertically downward, the materials in the filler chamber 5 is squeezed, and the material is pumped out through the squeezing opening 41 on the piston body 4 and the pump nozzle 2. While when the piston body 4 slides vertically upward, a negative pressure is formed in the filler chamber 5, and the materials in the external structure can be replenished into the filler chamber 5 through the feed port 321 for next use.

Figure 4:
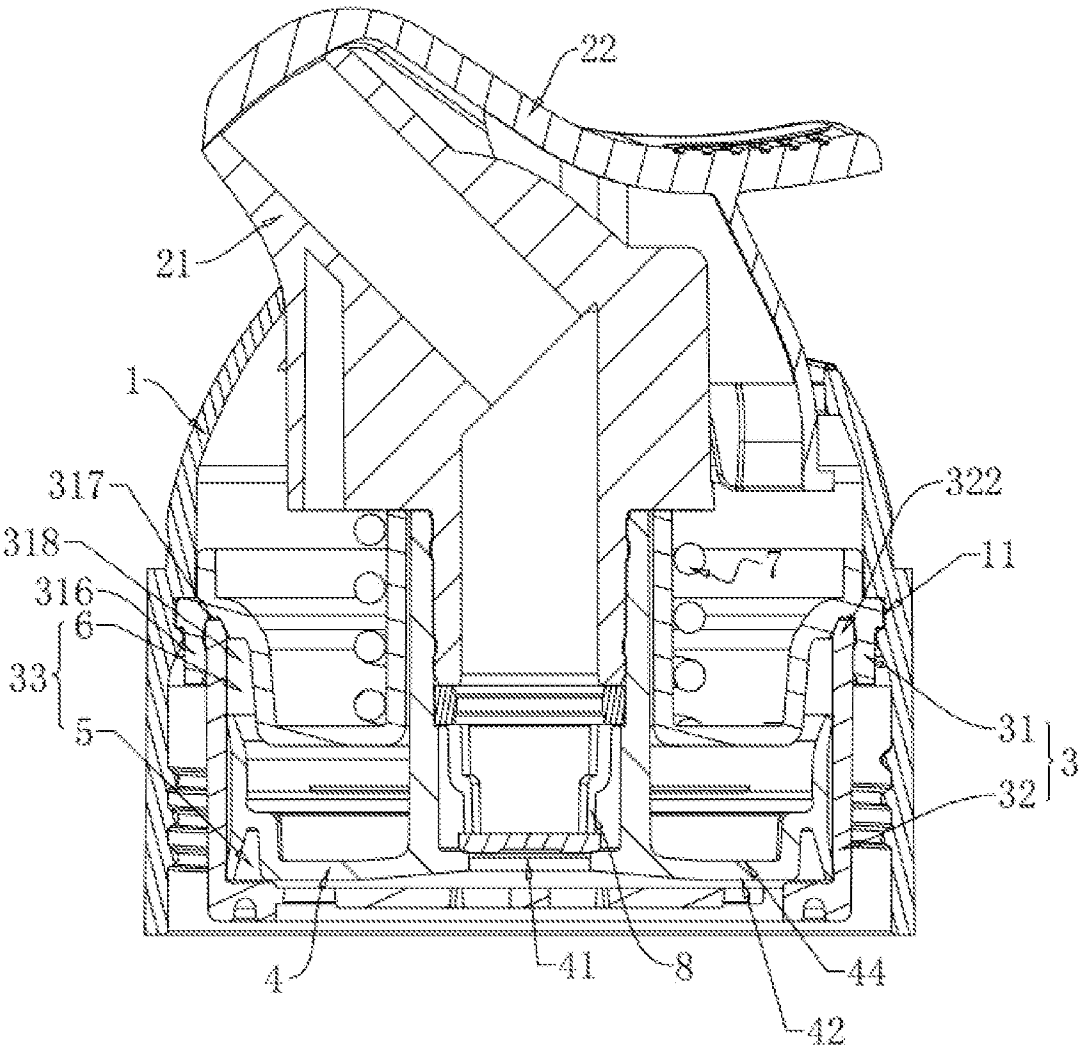
FIG. 4 is a cross-sectional view of a pump head when the restoring part is a spring.

As shown in FIG. 3 and FIG. 4, when squeezing and pumping the materials in the filler chamber 5, in order to have a better materials squeezing and extracting effect, the lower box 32 of the pump head is able to fit with the external structure to form a structure similar to an one-way valve, or an one-way valve or a structure with the same function can also be directly installed on the external structure. When the piston body 4 slides vertically downward, the materials in the filler chamber 5 is prevented from flowing back to the external structure; and when the piston body 4 slides vertically upward, it does not affect replenishment of the materials in the external structure into the filler chamber 5.

Figure 5:
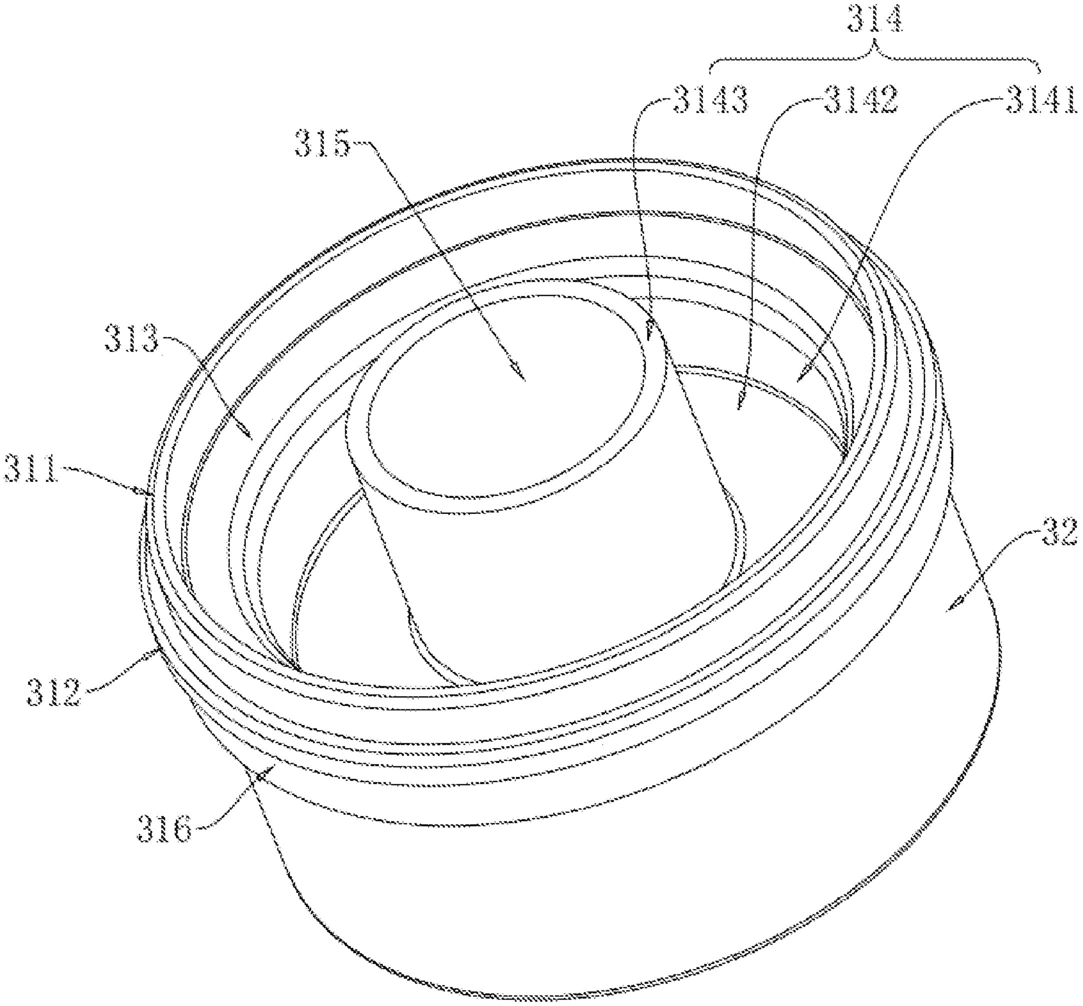
FIG. 5 is an isometric view of a suction chamber shown in FIG. 1.

As shown in FIG. 4 and FIG. 5, the upper cover 31 is a disc-shaped structure concave to the center. An outer circumference of a top surface along the vertical direction extends to form an upper ring plate 311, and the side surface of the circumference of the upper cover 31 extends along the horizontal direction to form a clamping convex ring 312. The inner wall of the shell body 1 is accordingly provided with a clamping ring groove 11, and the upper cover 31 is fixedly connected with the shell body 1 through clamping fit between the clamping convex ring 312 and the clamping ring groove 11. When the upper cover 31 is fixedly connected with the shell body 1, the upper ring plate 311 abuts the inner wall of the shell body 1, that is, when the shell body 1 is assembled with the upper cover 31, the upper ring plate 311 plays a role of guiding, positioning and auxiliary fixing. An inside of the bottom circumferential edge of the upper ring plate 311 bends downward to form an arc-shaped part 313, and the inside of the bottom circumferential edge of the arc-shaped part 313 extends to form a positioning part 314, and a mounting hole 315 is provided at a center of the positioning part 314. The piston body 4 is communicated and fixed with the pump nozzle 2 in the mounting hole 315, that is, the pump nozzle 2 moves to drive the piston body 4 to slide vertically in the mounting hole 315. The bottom surface of the clamping convex ring 312 extends vertically downward to form a lower ring plate 316, and a clamping groove 317 fitting with the arc-shaped part 313 is formed in the lower ring plate 316. Correspondingly, a clamping block 322 is formed at a top end of the lower box 32, and the upper cover 31 is fixedly clamped with the lower box 32 through a fit of the clamping block 322 and the clamping groove 317. When the upper cover 31 is fixedly clamped with the lower box 32, the lower ring plate 316 abuts an outer surface of the upper of the lower box 32, so as to improve the positioning accuracy when the upper cover 31 and the lower box 32 are assembled and the structural stability after being assembled.

Figure 6:
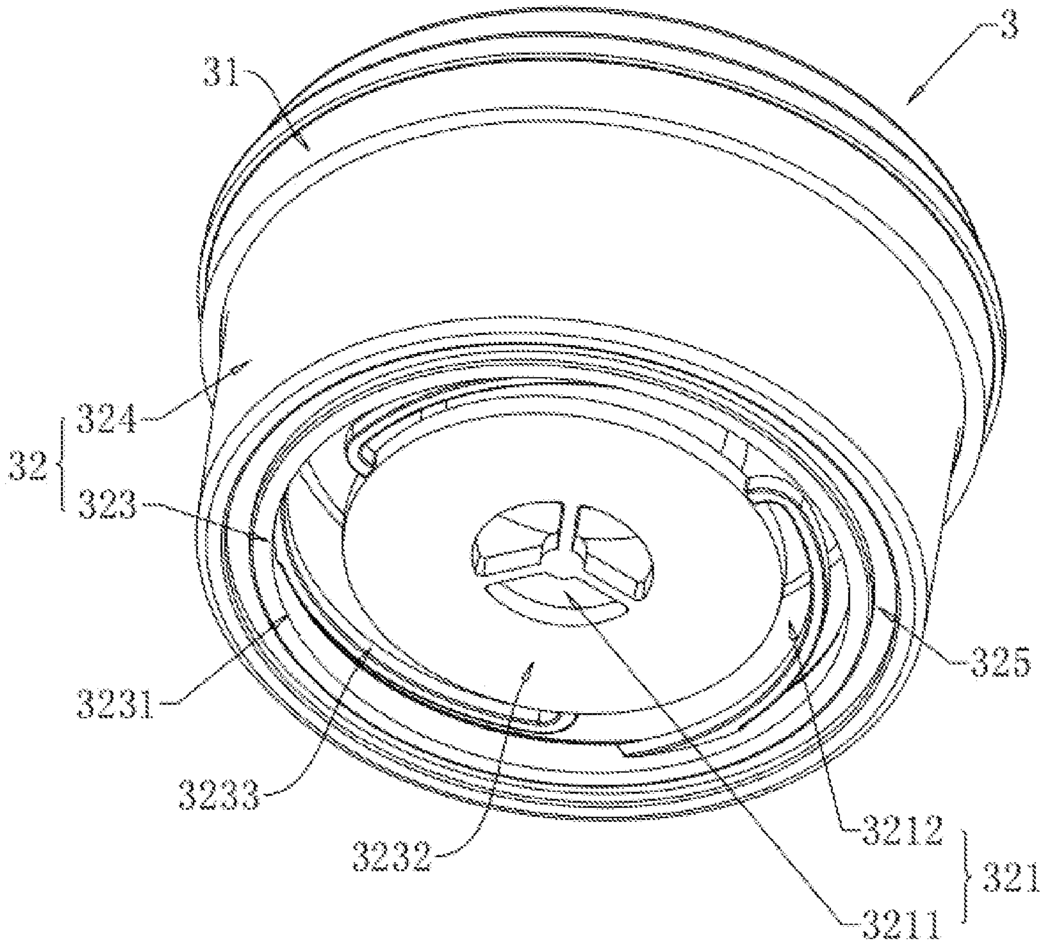
FIG. 6 is an isometric view of the suction chamber shown in FIG. 1.

As shown in FIG. 4 and FIG. 6, a shape of a vertical section of the lower box 32 is a flat U-shaped structure. The lower box 32 includes a horizontal bottom plate 323, and a side board 324 is formed vertically upward at a circumferential edge of the bottom plate 323. The clamping block 322 is formed at a circumferential edge of the top of the side board 324, while the feed port 321 is provided in the bottom plate 323. The feed port 321 includes a central opening 3211 and a peripheral opening 3212. The central opening 3211 is provided at a center of the bottom plate 323, and directly opposite to the squeezing opening 41 of the piston body 4. The peripheral opening 3212 is provided at a circumferential position of the central opening 3211, and the peripheral opening 3212 corresponds to the circumferential position at the piston body 4 away from the squeezing opening 41. Materials in the external structure can enter to the filler chamber 5 through the central opening 3211 and the peripheral opening 3212 respectively, so as to achieve rapidly replenishing and filling the filler chamber 5.

As shown in FIG. 4 and FIG. 5, the positioning part 314 includes a first positioning plate 3141 formed by extending downward of the arc-shaped part 313, and the first positioning plate 3141 is inclined a certain angle toward an inner side. The outer surface of the first positioning plate 3141 is provided with a positioning groove 318 fitting with an inner surface of the side board 324, and the positioning groove 318 is used for positioning and inserting of the piston body 4. Bottom end of the first positioning plate 3141 extends horizontally toward an inner side and form a second positioning plate 3142, and the second positioning plate 3142 is a ring plate structure; and an inner circumference of the second positioning plate 3142 extends vertically upward to form a third positioning plate 3143, and the third positioning plate 3143 is a cylindrical plate, and the mounting hole 315 is a cylindrical hole of the third positioning plate 3143.

In the embodiment, the suction chamber 3 consists of two parts, and an overall structure formed by the two parts is fixed in the shell body 1. Of course, the suction chamber 3 can also be prepared by integral molding, and then is fixed with the shell body 1. Alternatively, the shell body 1 with the suction chamber 3 is prepared directly by integral molding.

Figure 7:
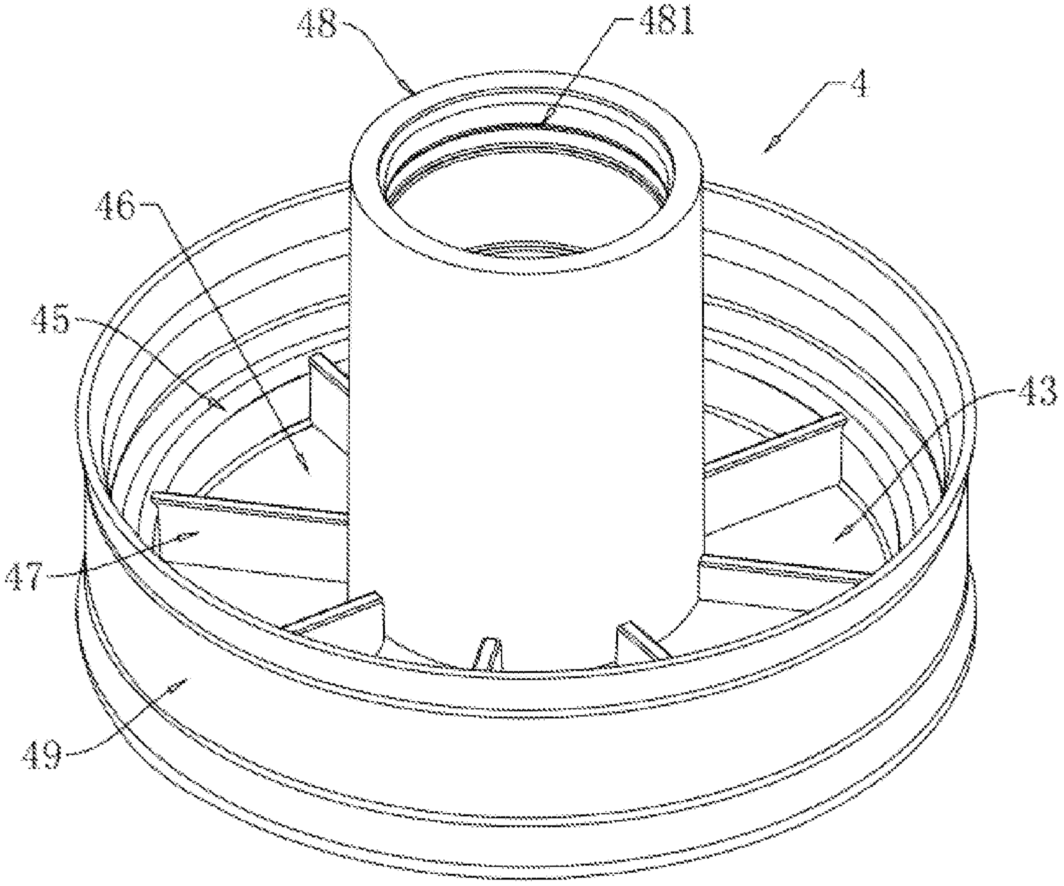
FIG. 7 is an isometric view of a piston body shown in FIG. 1.

As shown in FIG. 5 and FIG. 7, the piston body 4 includes a straight cylinder 48 with a center and an annular plug 49 surrounding the straight cylinder 48, the straight cylinder 48 is coaxially inserted into the mounting hole 315 and form a sliding plug-fit with the mounting hole 315, and is connected with the pump nozzle 2. A sliding and sealing fit is formed between an outer circumferential surface of the annular plug 49 and an inner wall of the lower box 32. A limiting portion 45 is formed by horizontally extending of the part of inner circumferential surface of the annular plug 49 near the lower end, and the limiting portion 45 is used to form an abutting fit with the second positioning plate 3142, so as to limit an upward sliding position of the piston body 4. An end of the limiting portion 45 away from the annular plug 49 vertically bends downward and then horizontally extends to form a sunk portion 43, and then, an overall structure is formed by an integrally molding of the sunk portion 43 and the bottom circumferential edge of the straight cylinder 48. In combination with FIG. 8, a recess 46 is formed in the part of the sunk portion 43 away from the filler chamber 5, and the recess 46 is a circular ring shape surrounding the straight cylinder 48. Stiffeners 47 are uniformly formed on an upper surface of the sunk portion 43 along a circumferential direction of the recess 46, and the stiffeners 47 play a role of improving structural strength of the piston body 4.

Figure 8:
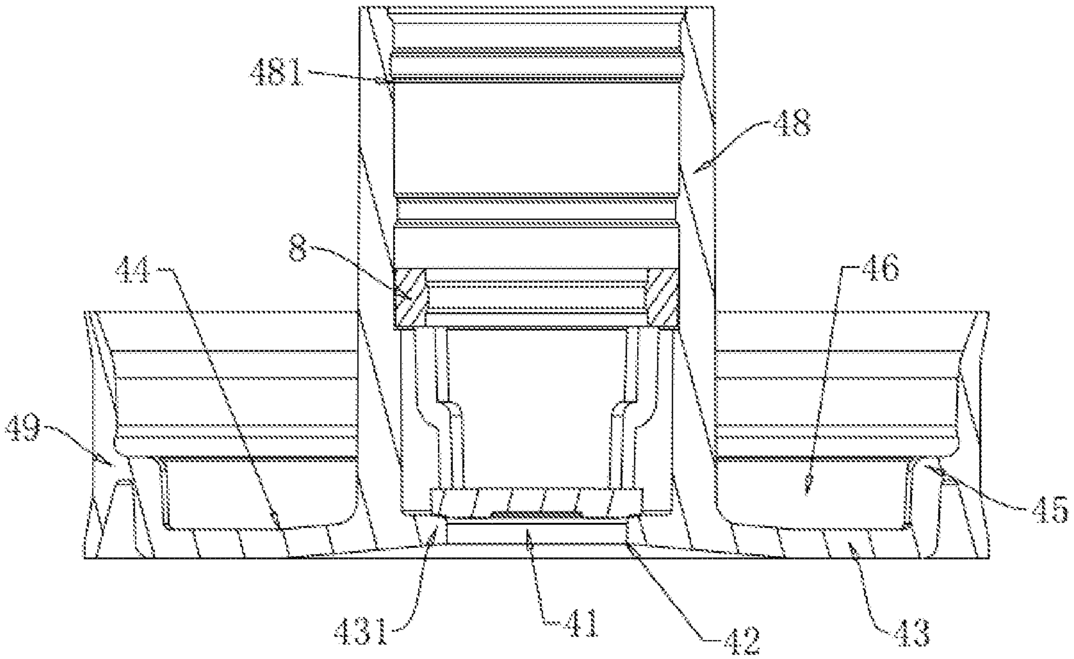
FIG. 8 is a cross-sectional view of a piston body and an one-way valve.

As shown in FIG. 4 and FIG. 8, the sunk portion 43 and the circumferential edge of the bottom end of the straight cylinder 48 are integrally formed, and an extending section 431 is formed by extending the sunk portion 43 toward the straight cylinder 48. The extending section 431 is a ring plate structure, and a through hole at its center is used as the squeezing opening 41. The squeezing surface 42 of the piston body 4 is inclined from a position on the sunk portion 43 away from the squeezing opening 41 toward the squeezing opening 41, that is, the part of the horizontal bottom surface of the sunk portion 43 away from the squeezing opening 41 is horizontal, while the part of the horizontal bottom surface of the sunk portion 43 close to the squeezing opening 41 is inclined toward the upper negative pressure chamber 6, and the bottom surface of the extending section 431 is also inclined toward the upper negative pressure chamber 6. When squeezing and taking the materials, the materials in the filler chamber 5 is quickly guided to the squeezing opening 41 along an inclined surface of the squeezing surface 42, and then quickly enter the squeezing opening 41. In addition, because of the sunk portion 43, a distance between the squeezing surface 42 of the piston body 4 and the bottom plate 323 of the lower box 32 becomes smaller, that is, a volume of the filler chamber 5 becomes smaller in exchange for a rapid flow of the materials, and rapidly pump out the materials.

Figure 9:
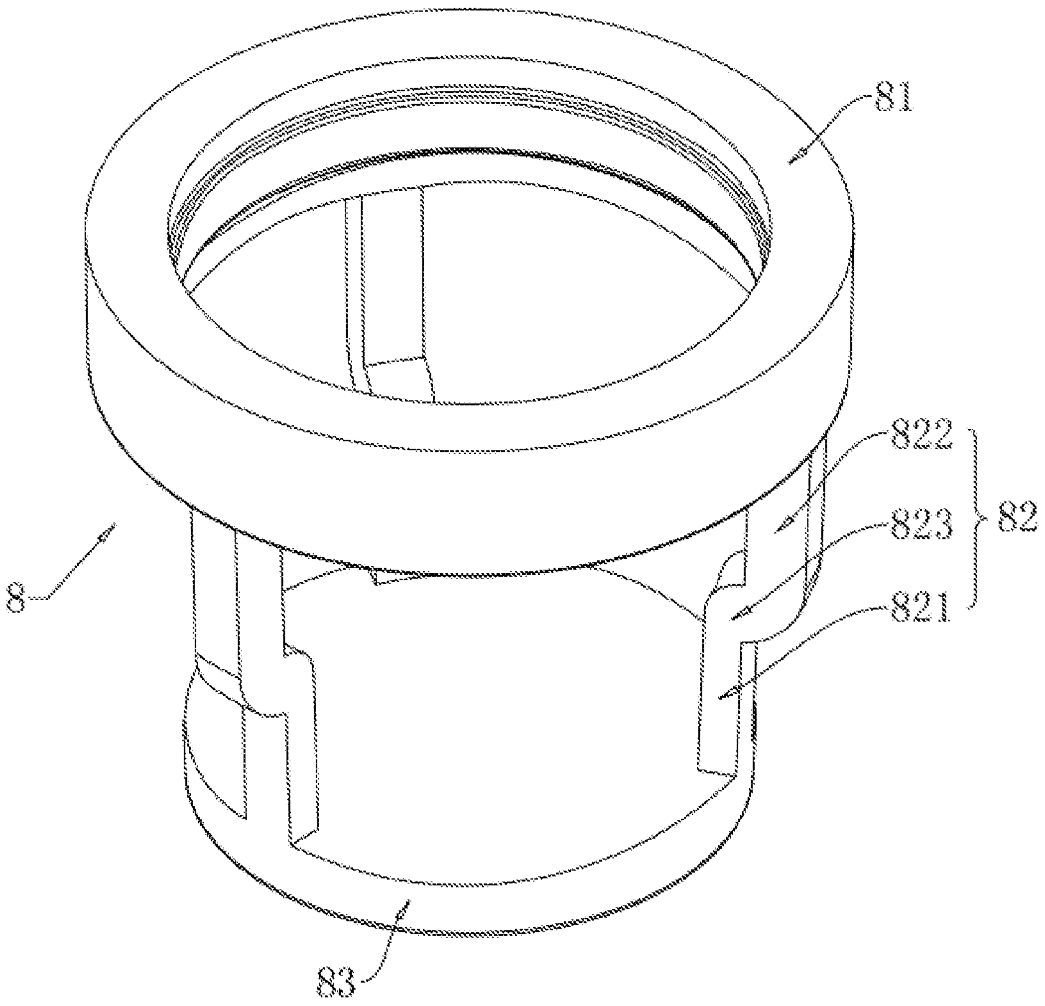
FIG. 9 is an isometric view of an one-way valve shown in FIG. 1.

As shown in FIG. 8 and FIG. 9, an one-way valve 8 is provided in the squeezing opening 41 of the piston body 4, the one-way valve 8 is used to close the squeezing opening 41. But, when the piston body 4 slides vertically downward to squeeze the materials, the materials can push open the one-way valve 8 and pump out through the squeezing opening 41 and the pump nozzle 2. The one-way valve 8 includes a mounting part 81 connected with the straight cylinder 48 of the piston body 4, and the mounting part 81 is a ring structure. Three arm portions 82 are formed by extending downward from the ring bottom surface of the mounting part 81. A shielding part 83 is integrally formed at bottom ends of the three arm portions 82 and the shielding part 83 is a horizontal circular block structure. The shielding part 83 completely closes the squeezing opening 41. The arm portion 82 and the shielding part 83 are made of elastic materials, such as rubber, elastic plastic material and so on. When the piston body 4 and the pump nozzle 2 moves together to squeeze and pump out the materials, the materials push the shielding part 83, and the arm portion 82 and the shielding part 83 are elastically deformed, and the squeezing opening 41 is opened for the materials to pass through.

As shown in FIG. 4 and FIG. 8, the pump nozzle 2 includes a discharge part 21 fixedly connected with the straight cylinder 48 of the piston body 4, and a pressing part 22 rotationally connecting with the discharge part 21, and a sliding clamping fit is formed between the whole composed of the discharge part 21 as well as the pressing part 22 and the shell body 1. The pump nozzle 2 can be driven to move downward by pressing the pressing part 22, so that the piston body 4 slides downward to squeeze and pump the materials. When the pump nozzle 2 moves up to reset, a limit can be realized through the clamping fit between the pressing part 22 and the shell body 1. A mounting groove 481 is coaxially provided at an inner wall of the upper cylindrical hole of the straight cylinder 48 of the piston body 4. The discharge part 21 is partially inserted into the upper cylindrical hole of the straight cylinder 48 and is fixedly clamped with the mounting groove. At the same time, the part of the discharge part 21 inserted into the straight cylinder 48 cooperates with the inner wall of the cylinder hole at the lower end of the straight cylinder 48 to clamp and fix the mounting part 81, and the purpose of fixing the one-way valve 8 is realized.

As shown in FIG. 8 and FIG. 9, the arm portion 82 includes a front arm 821 and a rear arm 822, the front arm 821 and the rear arm 822 are integrally formed. A lower end of the front arm 821 and circumferential edge of the shielding part 83 are integrally formed, and an upper end of the front arm 821 and the lower end of the rear arm 822 are integrally formed, and the upper end of the rear arm 822 and the circumferential bottom surface of the mounting part 81 are integrally formed. It should be noted that, the front arm 821 is staggered with the rear arm 822 and a torsion node 823 connects the front arm 821 and the rear arm 822. The front arm 821 is closer to the squeezing opening 41 than the rear arm 822. At the same time, an arm thickness of the front arm 821 is smaller than an arm thickness of the rear arm 822. When the materials push the shielding part 83, the arm portion 82 undergoes a moderate twisting deformation, and in combination with an elastic deformation of the shielding part 83, the squeezing opening 41 is quickly opened. Meanwhile, it is conducive to achieving a balance between a rapid passage of material through the extrusion opening 41 and a tightness of the extrusion opening 41.

As shown in FIG. 3 and FIG. 4, in order to realize self-reset of the pump nozzle 2 and the piston body 4, a restoring part 7 is provided in the shell body 1, which can be a spring or an elastomer. An upper end of the restoring part 7 abuts the discharge part 21, and a lower end of the restoring part 7 abuts the second positioning plate 3142 of the positioning part 314. After the pressing part 22 of the pump nozzle 2 is released, the restoring part 7 can drive the pump nozzle 2 and the piston body 4 to slide upward together until reset.

The operation principle of the pump head in the embodiment of the present application is described as follows.

When pumping the materials in the filler chamber 5, the pressing part 22 of the pump nozzle 2 is pushed down, and the pump nozzle 2 slides downward with the piston body 4 together. The piston body 4 squeezes the materials in the filler chamber 5, and the materials in the filler chamber 5 are quickly guided to the squeezing opening 41 along an inclined part of the squeezing surface 42, so as to push upward and open the one-way valve 8, the materials is pumped out through the squeezing opening 41 and the discharge part 21 of the pump nozzle 2.

After material taking operation is completed, the discharge part 21 of the pump nozzle 2 moves upward under restoring action of the restoring part 7 until the pressing part 22 of the pump nozzle 2 is clamped with the shell body 1. At the same time, the discharge part 21 drives the piston body 4 to move together. When the pump nozzle 2 is restoring in place, the limiting portion 45 of the piston body 4 abuts the second positioning plate 3142 of the upper cover 31. During the resetting process, the materials in the external structure can be replenished into the filler chamber 5 through the feed port 321. The one-way valve 8 closes the squeezing opening 41, and some materials are retained in the straight cylinder 48 and the discharge part 21, so as to further improve a response speed when the material is taken next time.

The embodiment of the present application also discloses a container with the pump head.

Figure 10:
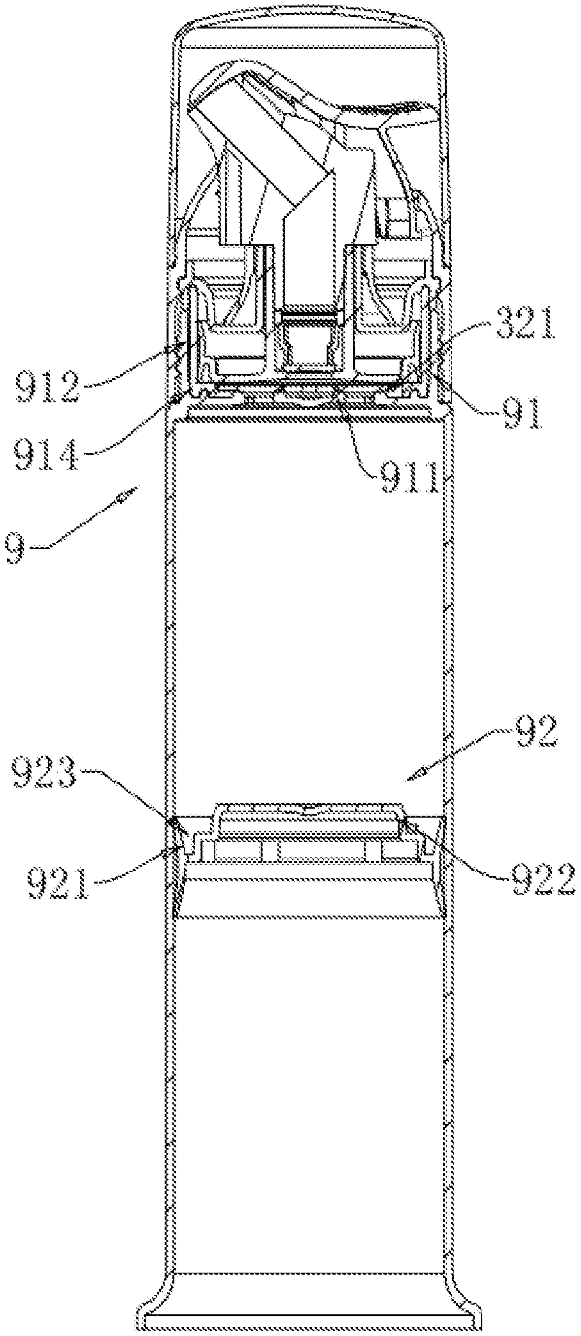
FIG. 10 is a cross-sectional view of the container with the pump head.
Figure 11:
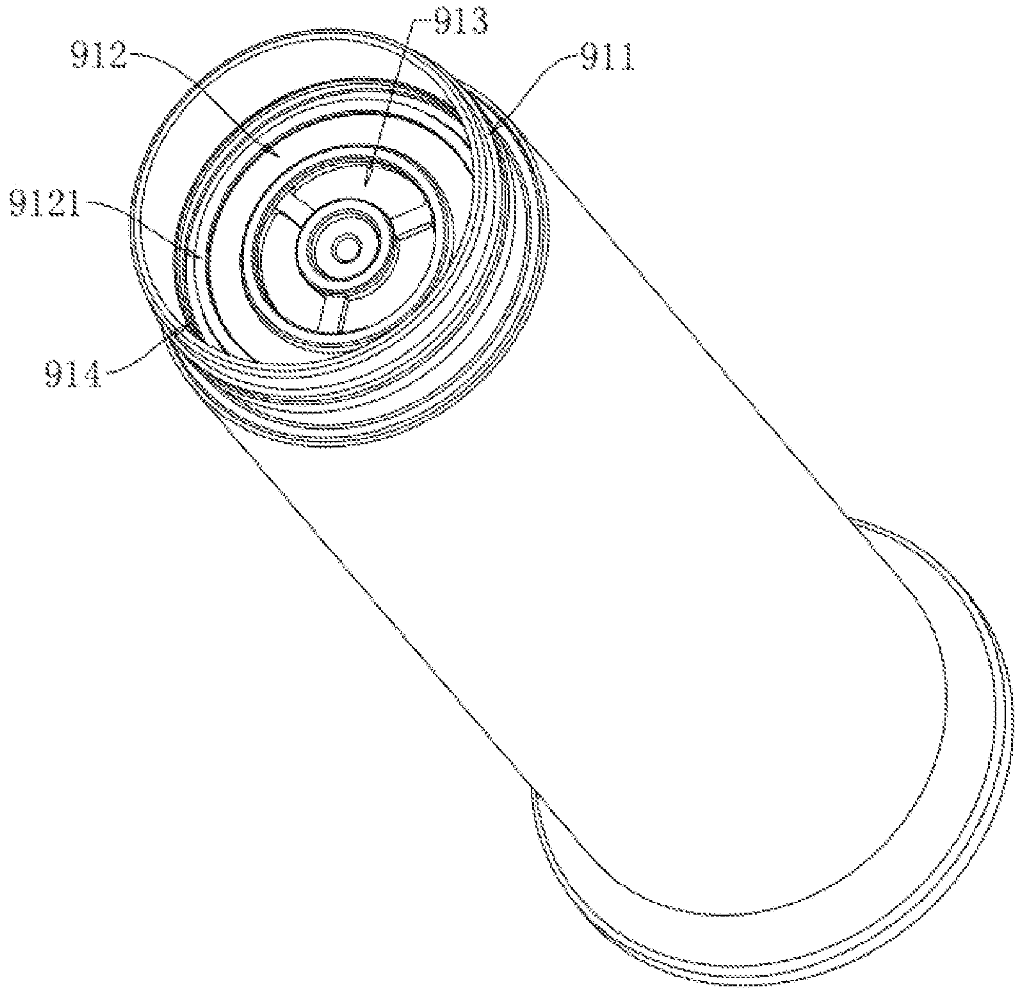
FIG. 11 is an isometric view of a container shown in FIG. 10.

Referring to FIGS. 10-11, a container with the pump head includes a container body 9.

In the embodiment, the container body 9 is a tubular structure, which is filled with toothpaste. Of course, it can also be replaced by other structures such as pot-shape. A specific shape can be selected according to an actual demand and a type of the materials actually loaded. A connector 91 and the top end of the container body 9 are integrally formed, and the connector 91 is detachably connected with the shell body 1 of the pump head in the above embodiment. A discharge port 913 is provided in the connector 91, which is an annular opening structure, and the discharge port 913 fits with the feed port 321 of the pump head to form an unidirectional communication structure. A bottom plug 92 is provided in a tube body of the container body 9 along a direction of the materials squeezing and pumping out, and is directly exposed to the outside at the tube bottom of the container body 9. The bottom plug 92 and the inner wall of the container body 9 form a sliding and sealing fit. So that, in a process of replenishing the materials in the container body 9 into the suction chamber 3, the bottom plug 92 can slide under an action of external atmospheric pressure to push the materials into the suction chamber 3. It not only realizes the unidirectional replenishment of the materials to the suction chamber 3 in the pump head, but also realizes the adaptative use of the pump head and different container bodies 9.

Referring to FIG. 10, the bottom plug 92 includes a scraping part 921 and a bottom table part 922, the scraping part 921 and a bottom table part 922 are integrally formed. The scraping part 921 is a ring structure, and an annular outer wall of the scraping part 921 is an inward concave structure with the upper and lower sides contracting inward. The upper and lower sides abut the inner wall of the container body 9 and forms a sliding and sealing fit with the inner wall of the container body 9. The bottom table part 922 is a multi-stage step structure and is formed in the scraping part 921, and fits with the inner wall of the scraping part 921 to form a pushing groove 923. The uppermost step of the bottom table part 922 extends beyond the upper side of the scraping part 921 in a height direction of the container body 9. During the process of the bottom plug 92 sliding to push the material inside the container body 9, the bottom table part 922 plays a role of mainly pushing and crushing the materials, and the pushing groove 923 plays a role of auxiliary pushing and pushing from a center to the peripheral side, and improve an overall pushing smoothness. While the scraping part 921 plays a role of scraping the materials remaining on the inner wall of the container body 9 and a certain role of gathering materials.

As shown in FIG. 10 and FIG. 11, the connector 91 includes a connecting part 911 integrally formed extending along a length direction of a pipe wall of the container body 9, and the connecting part 911 is a ring structure. The connector 91 further includes a joint part 912 integrally formed at a tube opening of the container body 9, and the joint part 912 is a plate structure and is horizontally formed inside the opening of the connecting part 911.

As shown in FIG. 10 and FIG. 11, when assembling the pump head and the container body 9, the connecting part 911 of the connector 91 needs to be integrally inserted into the shell body 1, and a threaded connection with the shell body 1 is formed. Top surface of the joint part 912 protrudes upward to form an annular protrusion 9121. Correspondingly, an annular groove 325 is formed at a bottom surface of the lower box 32 of the suction chamber 3, and an embedded positioning fit between the annular protrusion 9121 and the annular groove 325 is formed to further improve an accuracy and stability of the assembly. In addition, a sealing wedge 914 is formed through extending part of an inner wall of the connecting part 911 close to the joint part 912, and an abutting and sealing fit with the outer wall of the lower box 32 is formed, so as to further improve the tightness of the assembly of the container body 9 and the pump head.

Referring to FIG. 6, a central hole 3231, which is a circular hole, is formed in the bottom plate 323 of the lower box 32. A distributing plate 3232 connected in the central hole 3231 is a circular plate. The central opening 3211 of the pump head is vertically penetrated and provided at a center of the distributing plate 3232. A circular gap is formed between an outer wall of the distributing plate 3232 and an inner wall of the central hole 3231, and is used as a peripheral opening 3212 of the pump head. Hanging arms 3233 are formed between a circumferential outer sidewall of the distributing plate 3232 and hole inner wall of the central hole 3231, and the hanging arm 3233 is an elastic plate structure that is bent and formed in a plane where the distributing plate 3232 is located.

As shown in FIG. 6 and FIG. 11, the joint part 912 is arranged opposite to the bottom plate 323 and abuts the bottom plate 323, and when the two abut against each other, the central opening 3211 and the peripheral opening 3212 in the bottom plate 323 are closed by the joint part 912, the discharge port 913 of the joint part 912 is closed by the distributing plate 3232. When replenishing materials into the pump head, the distributing plate 3232 moves upward and separates from the joint part 912 under an action of negative pressure and material squeezing. At this time, the hanging arm 3233 is elastically twisted to a certain extent, and the materials can enter the pump head through the discharge port 913, the gap generated after separation, the central opening 3211 and the peripheral opening 3212. After replenishing materials, the distributing plate 3232 is restoring under the torsion of the hanging arms 3233 and the materials squeezing to re-close the central opening 3211 and the peripheral opening 3212, so as to realize an unidirectional replenishment of the materials from a container to the pump head.

In addition, it should be noted that, a position of the embedded positioning fit between the annular protrusion 9121 and the annular groove 325 is at an outer side of the bottom plate 323 away from the distributing plate 3232, so as to avoid affecting the unidirectional replenishment of the materials.

The using process of the container with the pump head in the embodiment of the present application is as follows.

When taking out the toothpaste in the pump head, press the pump nozzle 2, and the pump nozzle 2 moves to drive the piston body 4 to slide downward in the suction chamber 3, and squeeze the toothpaste in the filler chamber 5. The toothpaste in the filler chamber 5 pushes open the one-way valve 8 under the squeezing action, and is pumped out through the squeezing opening 41 and the pump nozzle 2. At this time, under the squeezing action, the distributing plate 3232 tightly abuts the joint part 912, and the discharge port 913 is closed.

When replenishing toothpaste for the pump head, the user stops pressing the pump nozzle 2 and releases it, the restoring part 7 reversely drives the pump nozzle 2 and the piston body 4 to move. The piston body 4 slides upward in the suction chamber 3, and a negative pressure environment is formed in the filler chamber 5. The squeezing opening 41 is closed by the one-way valve 8, while the distributing plate 3232 is opened upward under the action of negative pressure and the pushing of the materials in the container body 9, that is, the distributing plate 3232 is separated from the joint part 912. At this time, the hanging arms 3233 are elastically twisted, and the toothpaste in the container body 9 enters the filler chamber 5 through the discharge port 913, the gap generated after separation, the central opening 3211 and the peripheral opening 3212. At the same time, the bottom plug 92 moves under the action of external atmospheric pressure to squeeze the materials in the container body 9, and materials are pumped out.

After replenishing the toothpaste, the distributing plate 3232 is restored under a torsion of the hanging arm 3233 and the squeezing of the toothpaste in the suction chamber to re-closes the central opening 3211 and the peripheral opening 3212, and the bottom plug 92 stops moving.

What is provided above is the preferred embodiments according to the present application, and the protection scope of the present application is not limited to the above embodiments. Therefore, all equivalent changes made according to the structure, the shape and the principle of the present application should be considered as falling within the protection scope of the present application.

What is claimed is:

1. A pump head comprising a shell body, wherein a suction chamber is provided in the shell body and unidirectionally in communication with an outside; a piston body is slidably mounted in the suction chamber; a pump nozzle is slidably mounted on the shell body and connected with the piston body; a one-way valve is provided on the piston body; the piston body and the pump nozzle are configured to move together to squeeze a material in the suction chamber so that the material is pumped out via the one-way valve and the pump nozzle; a squeezing opening is provided on the piston body and is in communication with the pump nozzle; the one-way valve is configured to close the squeezing opening; a side surface of the piston body for squeezing the material in the suction chamber is configured as a squeezing surface, and the squeezing surface is inclined from a position away from the squeezing opening toward a position close to the squeezing opening;

wherein the one-way valve comprises a mounting part fixed on the piston body, an arm portion extends from the mounting part towards the squeezing opening and connects with a shielding part, the shielding part is made of an elastic material and is configured to close the squeezing opening, and the piston body and the pump nozzle are configured to move together to squeeze the material in the suction chamber so that the shielding part is elastically deformed due to squeezing of the material to open the squeezing opening;

wherein the arm portion is made of the elastic material, the arm portion comprises a rear arm integrated with the mounting part and a front arm integrated with the shielding part, and the rear arm and the front arm are integrated with each other in a misaligned manner;

wherein a torsion node connects the front arm and the rear arm, and an arm thickness of the front arm is smaller than an arm thickness of the rear arm.

2. The pump head according to claim 1, wherein a filler chamber is formed by the squeezing surface and an inner wall of the suction chamber, and a sunk portion extending toward the filler chamber is formed on the piston body.

3. The pump head according to claim 2, wherein the squeezing surface is inclined in a direction from the sunk portion toward the squeezing opening.

4. The pump head according to claim 1, wherein a second side surface of the piston body away from the squeezing surface is configured as a negative pressure surface, a negative pressure chamber is formed by the negative pressure surface and an inner wall of the suction chamber, and the squeezing surface is inclined in a direction from the position away from the squeezing opening towards the negative pressure chamber.

5. The pump head according to claim 4, wherein a limiting portion extending toward the negative pressure chamber is formed on the piston body and abuts against an inner wall of the negative pressure chamber.

6. The pump head according to claim 4, wherein a recess is formed at a position of a sunk portion away from a filler chamber formed by the squeezing surface and the inner wall of the suction chamber, and a stiffener is formed in the recess.

7. The pump head according to claim 1, wherein a restoring part configured to restore both the pump nozzle and the piston body after pressing is provided in the shell body.

8. The pump head according to claim 7, wherein the restoring part is a spring or an elastomer.

9. The pump head according to claim 1, wherein the suction chamber comprises a bottom plate in communication with the outside, a feed port is provided on the bottom plate, and the feed port includes a central opening corresponding to the squeezing opening and a peripheral opening surrounding the central opening.

10. A container with a pump head according to claim 1, comprising a container body, wherein the container body comprises a connector detachably and sealingly connected with the shell body, the connector is provided with a discharge port for discharging material out of the container body, and a feed port of the suction chamber is in communication with the discharge port.

11. The container with the pump head according to claim 10, wherein a bottom plate of the pump head is provided with a central hole, a distributing plate is provided in the central hole via a hanging arm elastically formed between the distributing plate and a hole wall of the central hole, a central opening of the feed port is provided in the distributing plate, a peripheral opening of the feed port is defined between the hole wall of the central hole and a side wall of the distributing plate, and the distributing plate abuts against the connector and closes the discharge port.

12. The container with the pump head according to claim 10, wherein the connector is disposed between the shell body and the suction chamber, and a sealing wedge extends from the connector toward an outer wall of the suction chamber and is in abutment sealing fit with the outer wall of the suction chamber.

13. The container with the pump head according to claim 10, wherein a bottom plug is slidably provided in the container body along a direction of pumping out the material and is in sliding and sealing fit with an inner wall of the container body.

14. The container with the pump head according to claim 13, wherein the bottom plug comprises a scraping part in a sliding and sealing fit with the inner wall of the container body, and the scraping part is inclined towards the inner wall of the container body and abuts against the inner wall of the container body.

* * * * *